United States Patent Office 2,977,316
Patented Mar. 28, 1961

2,977,316

BACTERIOSTATIC CLEANSING COMPOSITIONS

Wilbur S. Taylor, Norwalk, Conn., assignor to R. T. Vanderbilt Co., Incorporated, New York, N.Y., a corporation of New York No Drawing. Filed Apr. 21, 1958, Ser. No. 729,567

9 Claims. (Cl. 252—107)

This invention relates to new and useful improvements in bacteriostatic cleansing compositions and more particularly has for its aim to provide amine complexes of zinc dimethyldithiocarbamate as the active agent in bacteriostatic cleansing compositions.

Many compounds are known that have bacteriostatic properties against specific bacteria or groups thereof. However, such a property may be destroyed or seriously impaired when the specific compound is incorporated into cleansing compositions, which generally include detergents.

One soap presently on the market contains tetramethylthiuram disulfide and another contains bis (2-hydroxy-3,5,6-trichlorophenyl) methane (commonly known as hexachlorophene). Quinn et al., at 2 Applied Microbiology 202–4 (1954), have discussed a method of evaluating bacteriostatic or medicated soaps and have included hexachlorophene and closely related compounds, sodium pentachlorophenate and zinc dimethyldithiocarbamate as bacteriostatic agents.

The retention of bacteriostatic properties by a compound after inclusion in a cleansing composition is only one of the necessary or desirable properties the compound must have to be considered as a desirable additive to the cleansing composition. It is extremely important that the compound exhibit substantivity, i.e., the property of remaining on the skin and retaining bacteriostatic activity over a period of time after washing and rinsing of the skin.

Other properties that are not concerned with the bacteriostatic properties directly are, however, important as far as commercial use of the cleansing composition by the general public is concerned. These include the following properties of a soap bar, powder, etc. after inclusion of the specific compound:

(1) Initial whiteness
(2) Color stability under sunlight exposure
(3) Color stability under aging
(4) Discoloration by copper present in stamping dies)
(5) Effect on copper (present in plumbing fixtures)
(6) Discoloration by water of high iron content
(7) Skin irritation It is an object of this invention to provide novel cleansing compositions that exhibit substantive bacteriostatic properties.

It is also an object of this invention to provide such a cleansing composition that exhibits highly desirable esthetic properties from the standpoint of consumer acceptance of the product.

It is a further object of this invention to provide a method of inhibiting the formation of body odors.

I have found that amine complexes of zinc dimethyldithiocarbamate as a class incorporated in cleansing compositions have properties comparing very favorably with former compounds used for this purpose and that in fact some of the amine complexes are considerably better than the previously used and reported compounds. The use of these cleansing compositions will retard the growth of body bacteria and inhibit formation of body odors over a long period of time.

The present invention is not concerned with the methods of preparing the amine complexes which are described in patents and other literature, e.g., Patent Nos. 2,208,327 (Lichty) and 2,805,996 (Deger). Generally the complexes are prepared by bringing together the amine and zinc dimethyldithiocarbamate in the presense of a reaction diluent such as gasoline, water or alcohol. Although these amine complexes have previously been described, their exact structure is not shown.

The specific procedures used to test the properties hereinbefore enumerated are described here in some detail. After preparation of the particular amine complex, 0.5% and 1% thereof was blended with "X" brand soap and/or "Z" brand soap representing two well-known proprietary soaps which do not contain bacteriostatic agents. In addition, 0.5% of each amine complex and 0.5% 2,6-ditertiary-butyl-4-methylphenol (a commercial stabilizer under the trade name "Vanlube PC") mixture was blended with each soap.

Bacteriostatic activity per se was tested by taking soap plugs of the blended soap ribbons and plating them on separate nutrient agar plates inoculated with *Bacillus subtilis* (found in soil and decomposing organic material), *Micrococcus pyogenes* var. *aureus* (found on the human skin) and *Salmonella typhosa* (cause of typhiod fever). These three bacteria are conventionally used in in vitro testing for activity and substantivity. The plates were incubated for 24 hours at about 37° C. and then the diameter of the zone of no bacterial growth around the plug measured in millimeters and recorded.

Substantivity was measured by soaking untanned calfskin buttons in an 8% solution of the test soap, then repeatedly rinsing the buttons in distilled water, and subsequently placing the buttons on nutrient agar plates inoculated with the same bacteria as noted above. Thereafter, the procedure is the same as followed for bacteriostatic activity per se.

The following table shows the bacteriostatic activity and substantivity results:

TABLE I

| No. | Soap | .1% VPC | Amine Complex | | Activity | | | Substantivity | | |
|---|---|---|---|---|---|---|---|---|---|---|
| | | | Name | Percent | S | A | T | S | A | T |
| 1 | X | No | None (control) | | Tr | Tr | 5 | 0 | 0 | 0 |
| 2 | X | Yes | do | | 0 | 0 | 0 | 0 | 0 | 0 |
| 3 | Z | No | do | | 0 | 0 | 0 | 0 | 0 | 0 |
| 4 | Z | Yes | do | | Tr | Tr | 0 | 0 | 0 | 0 |
| 5 | Z | No | do | | 0 | Tr | Tr | 0 | 0 | 0 |
| 6 | Z | Yes | do | | 0 | Tr | Tr | 0 | 0 | 0 |
| 7 | X | No | Methyl Zimate (control) | ½ | 26 | 18 | 24 | 9 | 3 | 6 |
| 8 | X | Yes | do | ½ | 26 | 18 | 22 | Tr | 2 | 4 |
| 9 | X | No | do | 1 | 30 | 20 | 24 | 10 | 4 | 8 |
| 10 | Z | No | do | ½ | 28 | 18 | 24 | 12 | 3 | 8 |
| 11 | Z | Yes | do | ½ | 26 | 18 | 22 | 9 | 4 | 6 |

TABLE I—Continued

| No. | Soap | .1% VPC | Amine Complex Name | Percent | Activity S | Activity A | Activity T | Substantivity S | Substantivity A | Substantivity T |
|---|---|---|---|---|---|---|---|---|---|---|
| 12 | Z | No | ---do--- | 1 | 30 | 20 | 26 | 6 | 4 | 10 |
| 13 | Z | No | ---do--- | ½ | 38 | 26 | 31 | 7 | 6 | 4 |
| 14 | Z | Yes | ---do--- | ½ | 38 | 24 | 28 | 8 | 5 | 3 |
| 15 | Z | No | ---do--- | 1 | 40 | 24 | 30 | 12 | 11 | 5 |
| 16 | Z | No | Methyl Tuads (control) | ½ | 29 | 20 | 23 | 6 | 4 | 3 |
| 17 | Z | Yes | ---do--- | ½ | 29 | 20 | 25 | 4 | 2 | Tr |
| 18 | Z | No | ---do--- | 1 | 28 | 19 | 23 | 10 | 10 | 6 |
| 19 | Z | No | ---do--- | 1 | | | | 5 | Tr | Tr |
| 20 | X | No | Cyclohexylamine | ½ | 22 | 17 | 17 | 6 | 1 | 5 |
| 21 | X | Yes | ---do--- | ½ | | | | | | |
| 22 | X | No | ---do--- | 1 | 24 | 20 | 14 | 14 | 3 | 8 |
| 23 | Z | No | ---do--- | ½ | 26 | 18 | 22 | 7 | 2 | 4 |
| 24 | Z | Yes | ---do--- | ½ | 26 | 19 | 22 | 6 | 2 | 3 |
| 25 | Z | No | ---do--- | 1 | 22 | 18 | 15 | 6 | 2 | 2 |
| 26 | X | No | 1,1,3,3-tetramethylbutylamine | ½ | 25 | 16 | 30 | 12 | 2 | 3 |
| 27 | X | Yes | ---do--- | ½ | | | | | | |
| 28 | X | No | ---do--- | 1 | 27 | 18 | 35 | 14 | 4 | 9 |
| 29 | Z | No | ---do--- | ½ | 21 | 15 | 16 | 0 | 0 | 0 |
| 30 | Z | Yes | ---do--- | ½ | 20 | 16 | 18 | Tr | 0 | 0 |
| 31 | Z | No | ---do--- | 1 | 36 | 22 | 33 | 6 | 2 | 5 |
| 32 | X | No | Ethylenediamine | ½ | 24 | 14 | 28 | 7 | 2 | 2 |
| 33 | X | Yes | ---do--- | ½ | | | | | | |
| 34 | X | No | ---do--- | 1 | 24 | 17 | 26 | 12 | 4 | 9 |
| 35 | Z | No | ---do--- | ½ | 20 | 14 | 17 | 0 | 0 | 0 |
| 36 | Z | Yes | ---do--- | ½ | 21 | 19 | 16 | Tr | 0 | 0 |
| 37 | Z | No | ---do--- | 1 | 30 | 12 | 20 | 8 | Tr | 2 |
| 38 | X | No | 2-methoxyethylamine | ½ | 20 | 14 | 26 | Tr | 0 | Tr |
| 39 | X | Yes | ---do--- | ½ | | | | | | |
| 40 | X | No | ---do--- | 1 | 22 | 15 | 30 | 8 | 2 | 2 |
| 41 | X | No | Pyrrolidine | ½ | 22 | 15 | 30 | 5 | Tr | 2 |
| 42 | X | Yes | ---do--- | ½ | | | | | | |
| 43 | X | No | ---do--- | 1 | 22 | 17 | 40 | 9 | 2 | 4 |
| 44 | X | No | Morpholine | ½ | 21 | 10 | 18 | 0 | Tr | Tr |
| 45 | X | Yes | ---do--- | ½ | | | | | | |
| 46 | X | No | ---do--- | 1 | 23 | 10 | 20 | 6 | 2 | 6 |
| 47 | Z | No | Tertiary-octylamine (East.) | ½ | 36 | 26 | 29 | 3 | 2 | 3 |
| 48 | Z | Yes | ---do--- | ½ | 37 | 25 | 27 | 10 | 3 | 1 |
| 49 | Z | No | ---do--- | 1 | 36 | 24 | 27 | 10 | 4 | 6 |
| 50 | Z | No | ---do--- | 1 | 30 | 18 | 22 | 16 | 4 | 8 |
| 51 | Z | No | ---do--- | 1 | 28 | 16 | 18 | 7 | Tr | 3 |
| 52 | Z | No | ---do--- | 1 | 30 | 16 | 18 | 10 | 4 | 8 |
| 53 | Z | No | Tertiary-octylamine (R. & H.) | ½ | 36 | 22 | 26 | 8 | 4 | 2 |
| 54 | Z | Yes | ---do--- | ½ | 33 | 28 | 23 | 4 | 1 | 4 |
| 55 | Z | No | ---do--- | 1 | 36 | 26 | 24 | 7 | 8 | 5 |
| 56 | Z | No | ---do--- | 1 | 31 | 20 | 20 | 14 | 5 | 8 |
| 57 | Z | No | Triethylenetetramine | ½ | 35 | 26 | 23 | 4 | 5 | 3 |
| 58 | Z | Yes | ---do--- | ½ | 32 | 24 | 22 | 2 | 2 | Tr |
| 59 | Z | No | ---do--- | 1 | 38 | 25 | 22 | 6 | 4 | 6 |
| 60 | Z | No | ---do--- | 1 | 30 | 18 | 19 | 5 | 2 | 2 |
| 61 | Z | No | Aminoethylethanolamine | ½ | 36 | 24 | 20 | 1 | 2 | Tr |
| 62 | Z | Yes | ---do--- | ½ | 35 | 25 | 21 | 2 | 2 | 2 |
| 63 | Z | No | ---do--- | 1 | 36 | 26 | 25 | 6 | 6 | 4 |
| 64 | Z | No | ---do--- | 1 | 28 | 19 | 20 | 6 | 4 | 2 |
| 65 | Z | No | Dimethylaminopropylamine | ½ | 36 | 25 | 24 | 2 | Tr | 2 |
| 66 | Z | Yes | ---do--- | ½ | 37 | 22 | 22 | 1 | 0 | Tr |
| 67 | Z | No | ---do--- | 1 | 38 | 26 | 32 | 8 | 5 | 3 |
| 68 | Z | No | ---do--- | 1 | 27 | 17 | 20 | 4 | 2 | 3 |
| 69 | Z | No | Hydrazine | ½ | 36 | 26 | 29 | 8 | 4 | 4 |
| 70 | Z | Yes | ---do--- | ½ | 36 | 26 | 25 | 4 | 6 | 2 |
| 71 | Z | No | ---do--- | 1 | 36 | 26 | 27 | 12 | 6 | 6 |
| 72 | Z | No | ---do--- | 1 | 30 | 18 | 21 | 9 | 4 | 5 |
| 73 | Z | No | N-aminopropylmorpholine | ½ | 35 | 22 | 26 | Tr | 1 | Tr |
| 74 | Z | Yes | ---do--- | ½ | 34 | 22 | 25 | 1 | Tr | 1 |
| 75 | Z | No | ---do--- | 1 | 34 | 20 | 25 | 2 | 1 | 2 |
| 76 | Z | No | ---do--- | 1 | 25 | 16 | 18 | 4 | 2 | 2 |
| 77 | Z | No | N-ethylcyclohexylamine | ½ | 38 | 19 | 24 | 4 | 2 | 1 |
| 78 | Z | Yes | ---do--- | ½ | 35 | 22 | 26 | 2 | 2 | 2 |
| 79 | Z | No | ---do--- | 1 | 35 | 24 | 28 | 4 | 5 | 3 |
| 80 | Z | No | ---do--- | 1 | 26 | 17 | 16 | 8 | 3 | 6 |
| 81 | Z | No | Diallylamine | ½ | 33 | 25 | 26 | 1 | 1 | 2 |
| 82 | Z | Yes | ---do--- | ½ | 32 | 23 | 25 | 1 | ½ | 2 |
| 83 | Z | No | ---do--- | 1 | 38 | 24 | 28 | 2 | 2 | 2 |
| 84 | Z | No | ---do--- | 1 | 28 | 16 | 18 | 6 | 3 | 8 |
| 85 | Z | No | Tertiary-butylamine | ½ | 39 | 26 | 26 | 2 | 2 | 4 |
| 86 | Z | Yes | ---do--- | ½ | 38 | 26 | 28 | 4 | 2 | 4 |
| 87 | Z | No | ---do--- | 1 | 38 | 26 | 29 | 12 | 4 | 7 |
| 88 | Z | No | ---do--- | 1 | 28 | 20 | 21 | 12 | 3 | 5 |
| 89 | Z | No | Menthanediamine | 1 | 39 | 24 | 31 | 9 | 5 | 7 |

Key to Table I:
 VPC—2,6-ditertiary-butyl-4-methylphenol.
 S—*Bacillus subtilis*.
 A—*Micrococcus pyogenes* var. *aureus*.
 T—*Salmonella typhosa*.
 Tr—Trace.
 Methyl Zimate—Zinc dimethyldithiocarbamate.
 Methyl Tuads—Tetramethylthiuram disulfide.
 East.—Eastman Kodak (source of amine).
 R. & H.—Rohm & Haas (source of amine).
 Soap X } —Propietary soaps containing no bacteriostatic agent.
 Soap Z }

Thus it is obvious from the results reported in Table I that the amine complexes of zinc dimethyldithiocarbamate exhibit both bacteriostatic activity and substantivity. Various other desirable properties of the same soap-amine complex mixtures of Table I are reported in following tables.

The initial whiteness is rated visually as intensity of color, the shade of the control rating 0 and the most intense color as 4. The colors developed are indicated in Table II. 0 is the white of the control bar; 1 is the first shade of off-white distinguishable from the white of the control bar; 2 is the next shade of off-white deeper than 1; 3 is the next shade deeper than 2; 4 is the deepest color noted.

The sunlight color stability was tested by breaking a soap bar in half and exposing one-half in an east window for two weeks, the exposed half-bar being rotated one-quarter turn daily. Color darkening compared with the color of the unexposed half of the control bar (held in a closed opaque box at room temperature for the same period) was rated visually from 0 to 4 by half increments. 0 may or may not be white as it represents the soap from the initial whiteness test, e.g., soap No. 6 rated 0 on initial whiteness, darkens three shades in sunlight and is given a rating of 3 and soap No. 13 darkens two shades from its initial pink shade 3 and hence is given a rating of 2.

The heat aging color stability was tested by placing a half bar in a closed opaque box within an oven at 125° F. for two weeks which is presumed to be approximately equivalent to one year shelf storage. Visual ratings were then assigned in the same manner as for the sunlight test with 6 being the deepest color noted. The Z brand soaps develop yellow and green shades in this test which are so recorded.

The effect of a high iron content in water was tested by placing a half bar of soap flat in an open petri dish with sufficient water to cover the lower portion of the half bar. The water contained 1 p.p.m. of iron due to addition of the calculated amount of $FeCl_2 \cdot 4H_2O$, except for samples 5, 6, 13–19, and 47–55 wherein the water contained 5 p.p.m. as a result of dissolving $FeCl_3 \cdot 6H_2O$ in distilled water. The effect of iron was not tested on samples 57 through 89. Visual ratings of color change were assigned after the water had evaporated, 0 indicating no change from the color of the bars unexposed to iron, and 1 through 4 indicating increasingly dark shades to coppery red.

No skin irritation has been noted with any of the amine complexes tested.

Table II gives the results of the above tests, the sample number being retained from Table I but the amine names omitted for convenience of space.

TABLE II

Color stability

| No. | Initial Whiteness | Sunlight | Heat Aging | Iron Water |
|---|---|---|---|---|
| 1 | 0 | 1 | 1 | 0 |
| 2 | 0 | 1 | 1 | 0 |
| 3 | 0 | 1 | 1 | 0 |
| 4 | 0 | 1 | Tr | 0 |
| 5 | 1 V | 3 | 1 | 1 |
| 6 | 0 | 3 | 1 | 2 |
| 7 | 2 | 2.5 | 4 | 3 |
| 8 | 1 | 1.5 | 3 | 3 |
| 9 | 1 | 1.5 | 3 | 4 |
| 10 | 2 | 2.5 | 3 Y | 3 |
| 11 | 3 | 3.5 | 2 YG | 3 |
| 12 | 2 | 2.5 | 4 YG | 4 |
| 13 | 3 P | 2 | 2.5 | 4 |
| 14 | 3 P | 2 | 3 | 4 |
| 15 | 3 P | 1 | 3 | 3 |
| 16 | 2 | 2 | 4 | 3 |
| 17 | 2 | 2 | 5 | 4 |
| 18 | 2 | 1 | 5 | 3 |
| 20 | 4 | 4 | 3 | 1 |
| 21 | 3 | 3 | 3 Y | 1 |
| 22 | 4 | 4 | 4 G | 2 |
| 23 | 3 | 3 | 2 YG | 2 |
| 24 | 2 | 2.5 | 1 YG | 2 |
| 25 | 3 | 3.5 | 3 YG | 2 |
| 26 | 1 | 1.5 | 3 | 0 |
| 27 | 0 | 0.5 | 1 | 0 |
| 28 | 1 | 1.5 | 2 | 0 |
| 29 | 2 | 2.5 | 3 Y | 1 |
| 30 | 1 | 1.5 | 2 Y | 1 |
| 31 | 1 | 1.5 | 3 Y | 1 |
| 32 | 3 G | 0.5 | 1.5 | 0 |
| 33 | 2 G | 0.5 | 1.5 | 0 |
| 34 | 3 G | 0.5 | 2.5 | 0 |
| 35 | 3 G | 0.5 | 3 GY | 1 |
| 36 | 1 G | 0.5 | 2 GY | 1 |
| 37 | 3 G | 0.5 | 3 GY | 2 |
| 38 | 1 | 1.5 | 3 | 0 |
| 39 | 1 | 1.5 | 3 | 0 |
| 40 | 1 | 1 | 3 | 0 |
| 41 | 1 | 1 | 2 | 0 |
| 42 | 2 | 2 | 3 | 0 |
| 43 | 1 | 1 | 2 | 0 |
| 44 | 1 | 2 | 2 | 1 |
| 45 | 0 | 0.5 | 1 | 1 |
| 46 | 0 | 0.5 | 1 | 2 |
| 47 | 2 P | 2 | 3 | 2 |
| 48 | 2 P | 1 | 3.5 | 2 |
| 49 | 1 P | 1 | 3.5 | 2.5 |
| 53 | 2 P | 2 | 2 | 4 |
| 54 | 2 P | 2 | 3 | 3 |
| 55 | 1 P | 1 | 2.5 | 3.5 |
| 57 | 2 G | 2 | 3.5 | |
| 58 | 2 G | 2 | 3.5 | |
| 59 | 2 G | 2 | 3.5 | |
| 61 | 2 C | 2 | 2 | |
| 62 | 2 C | 2 | 2.5 | |
| 63 | 2 | 2 | 2.5 | |
| 65 | 1 P | 2 | 2.5 | |
| 66 | 1 C | 2 | 4 | |
| 67 | 1 | 2 | 5 | |
| 69 | 3 Y | 1 | 5 | |
| 70 | 3 Y | 2 | 6 | |
| 71 | 2 Y | 1 | 6 | |
| 73 | 1 | 2 | 1.5 | |
| 74 | 1 | 2 | 2 | |
| 75 | 2 | 2 | 3 | |
| 77 | 1 | 1 | 1.5 | |
| 78 | 1 | 2 | 2 | |
| 79 | 2 | 1 | 2 | |
| 81 | 1 P | 2 | 2 | |
| 82 | 1 | 2 | 3 | |
| 83 | 2 | 1 | 4 | |
| 85 | 1 P | 1 | 1.5 | |
| 86 | 1 P | 1 | 2.5 | |
| 87 | 1 | 1 | 2.5 | |
| 89 | 1 | 1 | 2 | |

Key to Table II:
Tr—Trace, less than 0.5 in shade.
C—Cream.
G—Green.
P—Pink.
V—Violet.
Y—Yellow.

It will be noted that soaps 20 to 89 with the amine complexes compare very favorably with and in many instances are superior to either the soaps 7 to 15 with zinc dimethyldithiocarbamate or soaps 16 to 19 with tetramethylthiuram disulfide for all of the discoloration features reported. It will be appreciated, of course, that several of the discoloration features reported in Table II such as initial whiteness, sunlight aging and shelf aging, can be counteracted by coloring the soap bar which is done with various commercial soaps.

Copper sensitivity as manifested by the staining of the soap bar is a defect which cannot be overcome by coloring the bar. More important than the discoloration of the soap bar is the cumulative deteriorating effect of the soap ingredients upon the copper-bearing plumbing and fixtures. Continued use of soaps containing these copper-sensitive ingredients leads to discoloration of and damage to the plumbing and fixtures.

In order to evaluate the effect of contact of copper with soap, a copper sensitivity test was devised. Bars of "Z" brand soap selected on the basis of activity and substantivity as reported in Table I were subjected to intimate contact with copper in the following test.

Test bars were prepared by scraping to provide a clean surface, then placed in contact with a clean strip of copper and held for two weeks at room temperature in a glass dish covered with "Pliofilm" brand plastic. A small amount of water was placed in each dish out of contact with soap or copper to provide a humid atmosphere. Conditions more nearly simulating those of actual use were then applied. The test soap bars were wetted with distilled water to thus emulsify the surface, the copper strips were also wetted and pressed into contact with the soap and the bars replaced in the dishes and the dishes were again covered with Pliofilm plastic and exposed for a week at room temperature, after which they were reopened. The sample bars were examined for staining of the soap and the copper strips were examined for evidence of staining after brush scrubbing and drying. The severity of the stain on the soap bars is reported from 0 (no stain) to 10 (the greatest stain) and the particular color of stain described. The stain on the copper strip after cleaning is reported as 0 (no stain) to 5 (very deep brown). The staining on either the soap or copper strip occurs only in the area where they are in contact.

TABLE III

*Copper sensitivity*

| No. | Copper on Soap | | Soap on Copper, Amount |
|---|---|---|---|
| | Color | Amount | |
| 5 | Green and violet | 2 | 1 |
| 6 | Green and gray | 2 | 0.5 |
| 10 | Brown | 8 | 4 |
| 11 | do | 7 | 4 |
| 12 | Chocolate brown | 9 | 5 |
| 16 | Purplish brown | 8 | 4 |
| 17 | do | 8 | 4 |
| 18 | do | 10 | 5 |
| 47 | Brown | 7 | 3 |
| 48 | Grayish brown | 6 | 2 |
| 49 | Brown | 8 | 3 |
| 53 | do | 6 | 3 |
| 54 | Grayish brown | 5 | 1 |
| 55 | Brown | 7 | 3 |
| 57 | Violet brown | 4 | 2 |
| 58 | Grayish brown | 4 | 2 |
| 59 | Violet brown | 4 | 2 |
| 61 | Violet green | 5 | 1.5 |
| 62 | Greenish violet | 5 | 1 |
| 63 | Purple | 6 | 1.5 |
| 65 | Violet green | 6 | 0.5 |
| 66 | Greenish violet | 6 | 0.5 |
| 67 | Purplish green | 7 | 0.5 |
| 69 | do | 7 | 1.5 |
| 70 | Tan purple | 6 | 0.5 |
| 71 | Greenish chocolate | 6 | 1.5 |
| 73 | Greenish violet | 3 | 0.5 |
| 74 | Greenish purple | 5 | 0.5 |
| 75 | Purplish green | 7 | 0.5 |
| 77 | Grayish purple | 5 | 1 |
| 78 | Greenish purple | 5 | 0.5 |
| 79 | Purplish brown | 7 | 1.5 |
| 81 | Bluish violet | 5 | 0.5 |
| 82 | Greenish brown | 5 | 0 |
| 83 | Bluish brown | 6 | 0 |
| 85 | Purplish tan | 7 | Tr |
| 86 | Green, purple, tan | 6 | 0.5 |
| 87 | Purplish brown | 8 | 0.5 |
| 89 | do | 8 | 0.5 |

The results of the copper test as reported in Table III show that the amine complexes cause less stain on soap and far less stain on copper than either the zinc dimethyldithiocarbamate or the tetramethylthiuram disulfide. This is a particularly important feature in view of the relative permanency of the plumbing fixtures.

The specific examples reported by way of the tables herein above included 0.5 to 1% by weight of the amine complex in the soap bar in order that specific comparisons could be made with the various complexes and also with various controls and prior art compounds. However, it will be obvious that a wider range of amine complex can be used and I have found from 0.2 to 10% to be generally a satisfactory range although this should not be a limiting feature on my invention.

Although it is not necessary for the success of this invention, it will be noted that the stabilizer 2,6-ditertiary-butyl-4-methylphenol enhances the color stability and reduces the copper sensitivity of many of the amine complexes when used in soap, particularly the tertiary-octylamine complex. The desirable range of this stabilizer is about 0.05 to 0.5% by weight of the soap.

It would appear from these results that the amine complexes of zinc dimethyldithiocarbamate have properties that will permit their use as an ingredient of a bacteriostatic or medicinal soap. It is furthermore true that the more successful complexes are derived from primary and secondary monoamines and diamines. The most successful amines of the tested complexes appear to be tertiary-butylamine, menthanediamine, dimethylaminopropylamine, hydrazine, N-ethylcyclohexylamine and tertiary-octylamines, including 1,1,3,3-tetramethylbutylamine.

It will be appreciated that the zinc dimethyldithiocarbamate alone is a fairly successful agent, particularly in regard to bacteriostatic activity and substantivity. In fact it is better in these two properties than tetramethylthiuram disulfide and hexachlorophene that are being used commercially at the present time. However, the zinc dimethyldithiocarbamate amine complexes are generally less sensitive in the copper tests than zinc dimethyldithiocarbamate alone. Furthermore, they have excellent original color in the soap bar. Both of these features are highly desirable and dictate the choice of the complexes for commercial product exploitation.

It is well known, that one of the desirable properties of a bacteriostatic soap is the inhibition of body odors over a period of time. Soaps incorporating the amine complexes of this invention serve in this same respect to inhibit body odors over a period of time. Furthermore, the complexes may be incorporated into cleansing compositions other than ordinary soaps such as the regular liquid, solid or powdered deodorants which are used primarily to inhibit body odors rather than for the removal of foreign materials from the body surface.

Generally the body deodorants on the market today include astringent and neutralizing compounds. The astringent compounds tend to close the pores of the sebaceous glands so as to reduce perspiration. The neutralizing compounds tend to mask the odor, prevent formation of ill-smelling compounds, or react therewith to chemically change them. Actually the freshly secreted product from the sebaceous glands is not considered ill-smelling but instead the odors are caused by decomposition products, the decomposition being caused by bacteria. Therefore, control of the body bacteria as exemplified by the examples herein serves to inhibit the formation of body odors. Most any common soap will reduce or destroy body odors at the time of application but substantivity is required if the odor-free condition is to be maintained over any period of time.

The amine complexes of this invention may be incorporated then in soaps (conventional cleansing soaps or cleansing detergents generally) or various other bases used to maintain personal hygiene by reducing body odor and cleansing compositions are used generically herein to include all bases that may be used for personal hygiene in reducing body odors. In fact, the amine complexes can be applied directly to the skin without a base to inhibit body odors if desired.

I claim:

1. A bacteriostatic cleansing composition comprising soap and an amine complex of zinc dimethyldithiocarbamate.

2. A bacteriostatic cleansing composition comprising soap and 0.2 to 10% by weight of an amine complex of zinc dimethyldithiocarbamate, said amine being selected from the group consisting of cyclohexylamine, 1,1,3,3-tetramethylbutylamine, ethylenediamine, 2-methoxyethylamine, morpholine, pyrrolidine, tertiary-octylamine, triethylenetetramine, aminoethylethanolamine, dimethylaminopropylamine, hydrazine, N-aminopropylmorpholine, N-ethylcyclohexylamine, diallylamine, tertiary-butylamine, and menthanediamine.

3. A bacteriostatic cleansing composition as claimed in claim 2 that also contains 0.05 to 0.5% by weight of 2,6-ditertiary-butyl-4-methylphenol.

4. A bacteriostatic cleansing composition as claimed in claim 2 wherein said amine is 1,1,3,3-tetramethylbutylamine.

5. A bacteriostatic cleansing composition as claimed in claim 2 wherein said amine is tertiary-butylamine.

6. A bacteriostatic cleansing composition as claimed in claim 2 wherein said amine is menthanediamine.

7. A bacteriostatic cleansing composition as claimed in claim 2 wherein said amine is dimethylaminopropylamine.

8. A bacteriostatic cleansing composition as claimed in claim 2 wherein said amine is hydrazine.

9. A bacteriostatic cleansing composition as claimed in claim 2 wherein said amine is N-ethylcyclohexylamine.

(References on following page)

References Cited in the file of this patent

UNITED STATES PATENTS

| | | |
|---|---|---|
| 2,588,428 | Stewart | Mar. 11, 1952 |
| 2,692,862 | Lipsitz | Oct. 26, 1954 |

OTHER REFERENCES

Bechtold: D. and C. Ind., 78:3, March 1956, pp. 326, 327, 402.

Fishburn: The Chemist and Druggist, vol. 148, October 4, 1947, p. 415.

Quinn: Applied Microbiology, 1954, pp. 202–4.

UNITED STATES PATENT OFFICE
CERTIFICATION OF CORRECTION

Patent No. 2,977,316                      March 28, 1961

Wilbur S. Taylor

It is hereby certified that error appears in the above numbered patent requiring correction and that the said Letters Patent should read as corrected below.

Column 1, line 54, before "present" insert an opening parenthesis; column 2, line 24, for "presense" read -- presence --; line 32, for "kell-known" read -- well-known --; column 3, line 67, for "Propietary" read -- Proprietary --; column 7, line 46, for "above" read -- have --.

Signed and sealed this 29th day of August 1961.

(SEAL)
Attest:

ERNEST W. SWIDER                      DAVID L. LADD
Attesting Officer                      Commissioner of Patents